(12) United States Patent
Waizman et al.

(10) Patent No.: US 6,946,824 B2
(45) Date of Patent: Sep. 20, 2005

(54) POWER DELIVERY SYSTEM HAVING A PLURALITY OF STAGES AND METHOD FOR SETTING POWER DELIVERY SYSTEM PARAMETERS

(75) Inventors: Alex Waizman, Zichron Yaakov (IL); Chee-Yee Chung, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 756 days.

(21) Appl. No.: 09/946,936

(22) Filed: Sep. 6, 2001

(65) Prior Publication Data

US 2003/0046594 A1 Mar. 6, 2003

(51) Int. Cl.$^7$ ................................................. G05F 1/40
(52) U.S. Cl. ............................ 323/285; 323/286; 363/1
(58) Field of Search ......................... 713/300; 323/285, 323/286, 224; 363/1, 71; 333/167

(56) References Cited

U.S. PATENT DOCUMENTS

| | | | | |
|---|---|---|---|---|
| 4,488,214 A | * | 12/1984 | Chambers ..................... | 363/71 |
| 6,064,187 A | | 5/2000 | Redl et al. | |
| 6,405,346 B1 | * | 6/2002 | Nawa ............................. | 716/2 |
| 6,703,697 B2 | * | 12/2004 | Leahy et al. ................ | 257/678 |

OTHER PUBLICATIONS

Waizman, Alex et al, "Package Capacitors on Microprocessor Maximun Operating Frequency", Jun. 2001.
Erisman, Brian et al, "Modify your switching—supply architecture for improved transient response", *EDN*, Nov. 11, 1999, pp 91–98.
Redl, Richard et al, "Optimizing the Load Transient Response of the Buck Converter" 1998 pp 170–176.
Waizman, Alex et al, "Package Capacitors Impact on Microprocessor Maximum Operating Frequency" *ECTC*, Jun. 2001, pp 1–20.
Redl, Richard et al, "Power Conversion Solutions" 1999.
Waizman, Alex et al, "Extended Adaptive Voltage Positioning (EAVP)",Oct. 23, 2000 pp 65–68.
Waizman, Alex et al, "Extended Adaptive Voltage Positioning", *EPEP 2000*, Oct. 23, 2000pp1–30.
Waizman, Alex et al, "Extended Adaptive Voltage Positioning", Sep. 7, 2000, pp 1–30.

* cited by examiner

*Primary Examiner*—Thomas Lee
*Assistant Examiner*—Suresh Suryawanshi
(74) *Attorney, Agent, or Firm*—Eitan, Pearl, Latzer & Cohen Zedek, LLP (57) ABSTRACT

A power delivery system and a method for setting the parameters of the power delivery system. The effective resistance of the capacitors for each stage may be set to be substantially equal to the effective resistance of the previous stage, and the time capacitive constant of the capacitors may be set to be substantially equal to the effective inductive time constant of the previous stage.

53 Claims, 4 Drawing Sheets

POWER DELIVERY SYSTEM HAVING A PLURALITY OF STAGES AND METHOD FOR SETTING POWER DELIVERY SYSTEM PARAMETERS

FIELD OF THE INVENTION

The present invention relates to a method for setting parameters for power delivery systems, such as systems delivering power to microprocessors or other components, and to power delivery systems incorporating such parameters.

BACKGROUND OF THE INVENTION

A typical power delivery system in a workstation or PC includes a power source or supply, such as a battery or a 120 v or 240 v AC supply and an AC/DC converter, converts the voltage from the source to a supply suitable for electronic components (e.g., 1.6 v, 5 v DC or any other voltage), and delivers the voltage to the components. In computing devices such as PCs and workstations, the central processing unit ("CPU," also termed microprocessor) typically has strict voltage tolerance requirements. The CPU alternately draws power or is idle, switching between full power consumption and no power consumption extremely quickly. The power delivery system should respond to the power demands of the CPU while providing a voltage that always remains within certain tolerances.

A power delivery system typically includes a voltage source followed by several stages of decoupling capacitors. When used herein, a decoupling stage (or "stage") is a division of a power delivery system, such as circuit including a set of capacitors and possibly other components or equipment. A decoupling stage may include parasitic inherent resistive and inductive elements. The power source (often termed Vreg or Vemf) is typically a DC supply supplying a certain voltage or set of voltages from the processed output of the ultimate power source—typically a battery or the processed output of an AC supply. The power source usually cannot respond quickly to fast current demand changes; in response to such changes the voltage supplied may fluctuate greatly.

The power delivery system is divided at several stages between the Vreg and the CPU itself, typically with arrangements of sets of capacitors of various values, in order to ensure that the voltage delivered to the CPU is within the required tolerance window despite rapid current demand fluctuations. Each set of capacitors is characterized by capacitance and associated parasitic inherent and interconnect resistance and inductance. Furthermore, each set of capacitors may include purposefully increased resistance; for example, additional resistive elements added to, added within, or connected to capacitors. For example, a typical power delivery system includes bulk (BLK) capacitors disposed on the motherboard and connected to the Vreg. While the bulk capacitors improve response time, they are typically physically large which leads to a considerable parasitic inductance, limiting the overall response time of these capacitors. Further sets of capacitors may be included on the motherboard (e.g., mid-frequency (MF) capacitors), in the package containing the CPU (PKG) and on silicon chip itself (DIE). At each stage (e.g., BLK, MF, PKG, DIE, etc.) the components improve response time through the damping effects of the capacitance. Multiple stages are usually needed. As the power delivery system progresses from the Vreg source to the die, the inductance of the capacitors typically decreases, as does the capacitance. The capacitance and the resistance of the capacitors at each stage may be adjusted to optimize the performance of that stage.

Thus, the typical power delivery system includes, inter alia, a power source Vreg and a series of stages leading up to the silicon chip itself. Current design methods, based essentially on trial and error, do not produce the ideal definition for the specifications for these components. Design inefficiencies in a power delivery system may result in too many or too few capacitors, or the incorrect type of capacitors, which may result in increased cost or the system not meeting the proper voltage tolerances.

One current method for reducing the cost of power supply systems while allowing the system to meet voltage tolerances provides for a voltage regulator where a smaller capacitance may be used while still allowing the regulator to provide voltage within the proper boundaries. According to this method, the voltage Vcc of the power source may be set to VccNom+Tolerance, where VccNom is the previous nominal value of Vcc, and Tolerance is the acceptable tolerance of the power delivery system. This adjustment allows a reduction in the capacitance of the stage immediately following the power source, typically the bulk capacitor stage. After the parameters of the power supply are set, the resistance of the bulk capacitors is set equal to the resistance of the voltage regulator. The capacitance of the bulk capacitors is then selected so that the time constant of the bulk capacitors is set equal to the time constant of the voltage regulator. Such a method does not optimize the design of an entire power delivery system.

Therefore, a need exists for power delivery systems that are both efficient and provide power within the stated tolerances, and for a method for designing such systems.

BRIEF DESCRIPTION OF THE DRAWINGS

The present invention will be understood and appreciated more fully from the following detailed description taken in conjunction with the drawings in which.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

An exemplary embodiment of the present invention provides for a power delivery system and a method for setting the parameters of the power delivery system, such that the cost and the capacity of the components (e.g., the capacitance) are minimized and such that the power delivery system responds quickly and provides a voltage that is within the required voltage tolerance parameters of the CPU. In alternate embodiments, a power delivery system and method for setting its parameters may be provided where the power delivery system provides power to components other than a CPU; for example a controller or a chipset.

Figure 1:
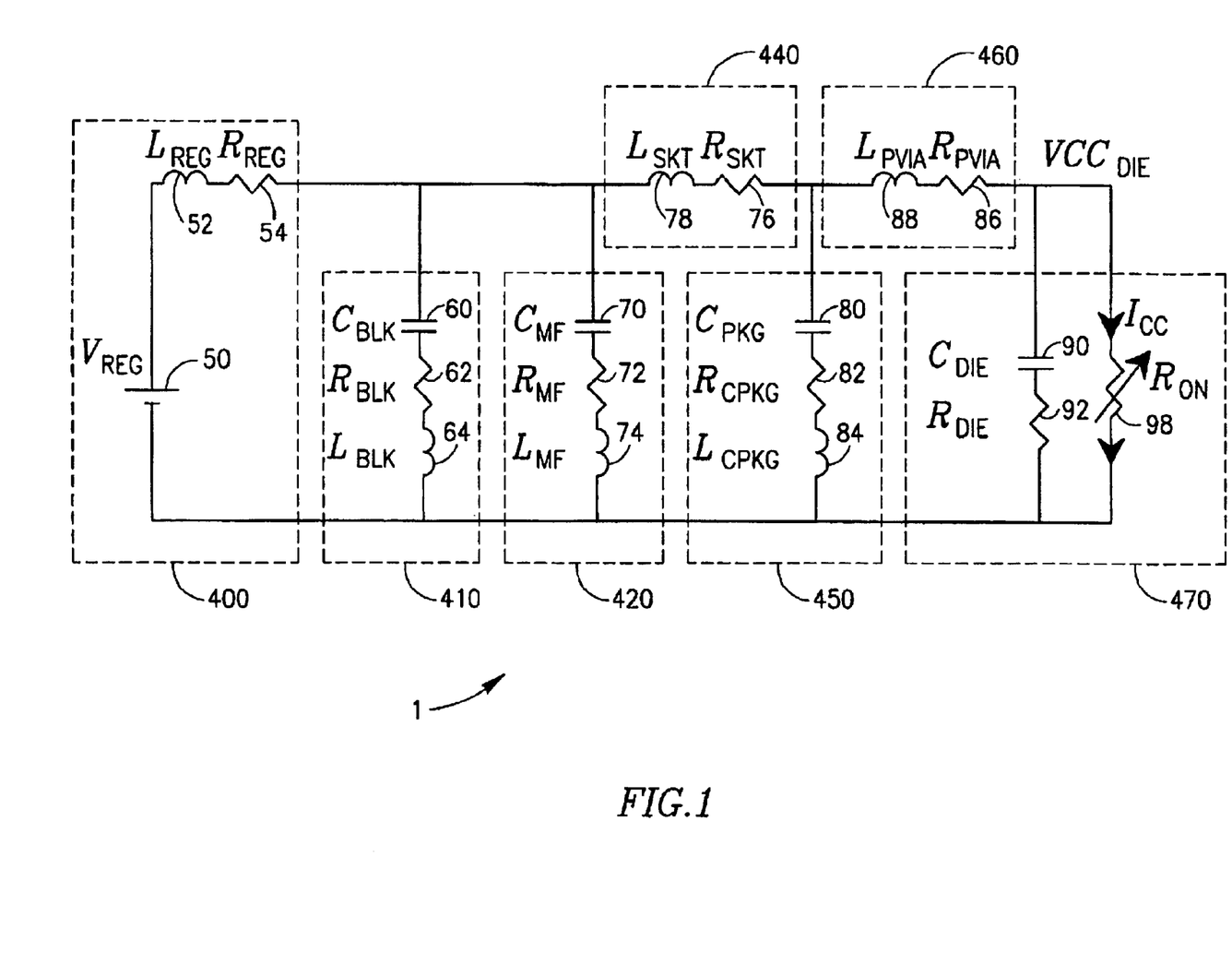
FIG. 1 is a diagram of a portion of a power delivery system according to an embodiment of the system and method of the present invention.

FIG. 1 is a diagram of a portion of a power delivery system according to an embodiment of the system and method of the present invention. FIG. 1 depicts only a portion of such a power delivery system; other additional components are not shown for the sake of clarity. Referring to FIG. 1, power delivery system 1 includes a power supply 400, which includes voltage source Vreg 50, inductance Lreg 52 and a resistance Rreg 54. Vreg 50 includes a power supply, and preferably supplies DC current. For example, Vreg 50 may include a battery or a processed AC supply; in alternate embodiments Vreg 50 may include other types of power supplies.

Bulk (BLK) capacitor stage 410 is typically disposed on the motherboard and includes one or more capacitors 60 having a capacitance Cblk and associated resistance Rblk 62 and inductance Lblk 64. The resistance of a stage may be defined as effective series resistance (ESR); other measures may be used. Capacitors 60 typically include electrolytic or tantalum capacitors, but may include other types of capacitors.

Mid-Frequency (MF) capacitors 420 include one or more mid-frequency capacitors 70 having a capacitance Cmf, resistance Rmf 72, and inductance Lmf 74. Mid-Frequency capacitors 420 are typically disposed on the motherboard, near the socket. Capacitors 70 are typically ceramic capacitors, but may be other types of capacitors. A socket 440 holds the CPU and includes socket pins. The socket pins may add a series resistance Rskt 76 and a series inductance Lskt 78.

Package (PKG) capacitors 450 may be included in the CPU package, on the package pin side, but may be included in other locations, for example on the die side. Package capacitors 450 typically include one or more capacitors 80 having a capacitance Cpkg, a resistance Rcpkg 82 and an inductance Lcpkg 84. Package capacitors 450 are connected to the die 470 by package vias 460. The package vias 460 may add a resistance Rpvia 86 and a series inductance Lpvia 88. The die 470 includes one or more capacitors 90 having a capacitance Cdie and a resistance Rdie 92. The CPU has a time dependent current consumption represented by the time varying resistor Ron 98.

Current load fluctuation frequency may be described as the frequency that the load (e.g., the current load demanded by a CPU) changes. Typically, such changes occur in an extreme, stepwise fashion or in a repetitive pattern, depending on, for example, software demands. Typically, the power supply 400 does not respond quickly to current load changes due to the relatively large Lreg 52, but handles changes that take place at low frequencies and over long terms well, while the small capacity capacitors (e.g., the die capacitors 90) respond very quickly to high frequency changes but lack the capacity to respond to changes taking place at low frequencies over long periods of time. An embodiment of the system and method of the present invention allows for a power delivery system to be designed such that each of the various decoupling stages may handle a certain range of current load fluctuation frequencies. As the frequency of the current load change changes and one decoupling stage starts to respond poorly, an adjacent stage starts to respond properly to the current change.

Figure 2:
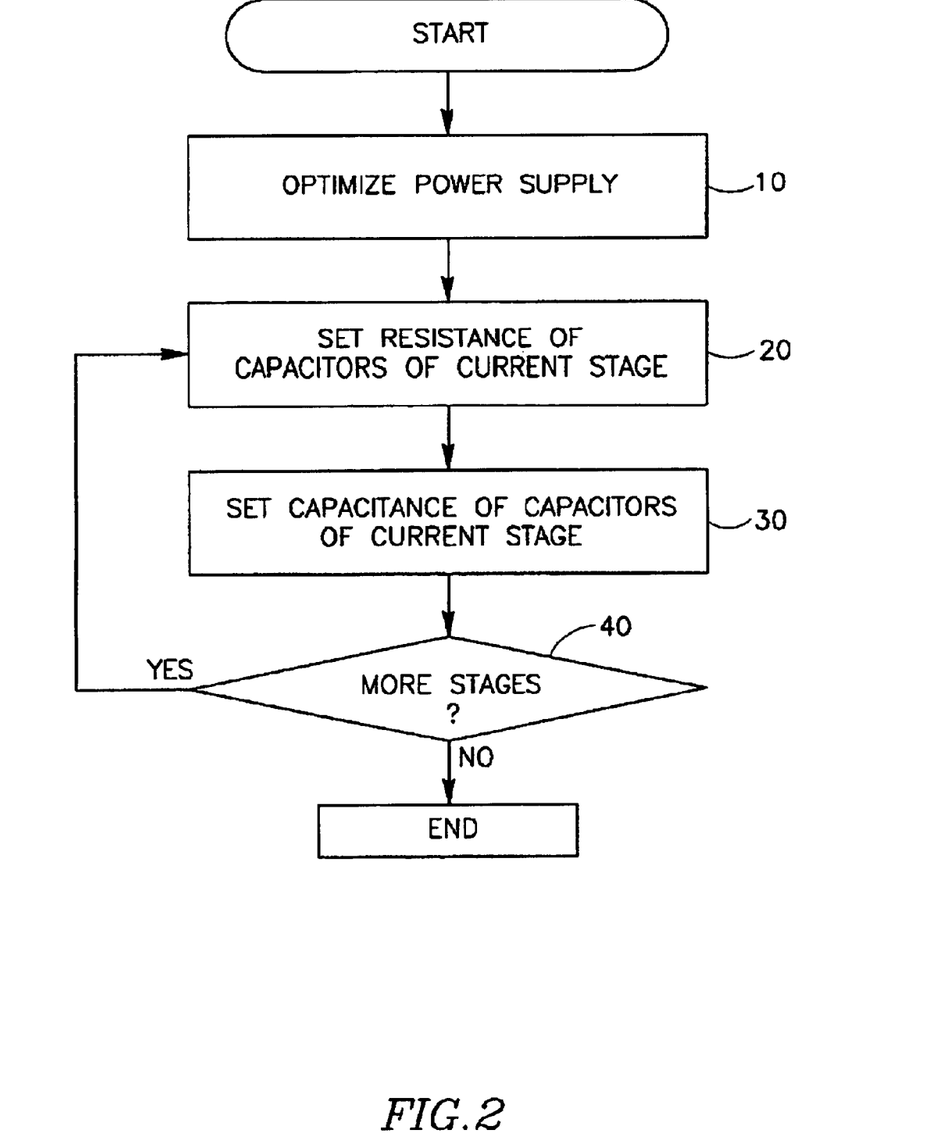
FIG. 2 is a flowchart showing the steps for determining the parameters for a power delivery system according an embodiment of the present invention.

In an exemplary embodiment of the system and method of the present invention, for at least some of the decoupling stages of the power delivery system, the resistance and capacitance of the set of capacitors in that stage (where a set of capacitors may include one or more capacitors) are selected based at least on the effective resistance and effective inductance of the previous stage. For each stage to which the method is applied, to determine the resistance and capacitance of the capacitors, a series of steps is performed. FIG. 2 is a flowchart showing the steps for determining the parameters for a power delivery system according an embodiment of the present invention. In alternate embodiments other series of steps may be used; for example, step 10 may be omitted or be executed in a different manner.

In step 10, the parameters for the supply stage 400 and Bulk (BLK) capacitor stage 410 are preferably optimized according to known methods. For example, the voltage Vcc of the power source may be set to VccNom+Tolerance, where VccNom is the previous nominal value of Vcc, and Tolerance is the acceptable tolerance of the power delivery system. In such a case, when a load is initially placed on the power source, the voltage drops but does not drop below the minimum acceptable voltage (VccNom−Tolerance), as the voltage is initially VccNom+Tolerance. To help ensure that the die voltage during the maximum current consumption step transient of the CPU does not go outside the +/−Tolerance window around VccNom, known methods of Lreg, Rreg, Rblk and Cblk design may be used. Rblk may be set equal or substantially equal to Rreg, and the inductive and capacitive time constants of Lreg/Rreg and Rblk·Cblk may be set equal or substantially equal. This adjustment allows a reduction in the capacitance of the stage immediately following the power source, typically the bulk capacitor stage.

In step 20, the resistance for the capacitors of the current stage is set by referring to the resistance of the previous stage. Preferably, the first stage to which step 20 is applied is the stage following the bulk capacitor stage; in alternate embodiments the first stage may be other stages. The resistance may be either the DC resistance or the effective AC resistance in instances where the components may have resistance variations with frequency, such as skin effect or any other phenomena that may lead to resistance variation with frequency. In one embodiment, the resistance for the set of capacitors for the current stage is considered to be the effective resistance or the ESR; alternate measures may be used. When used herein, the resistance, effective resistance or ESR for a set of capacitors (where the set may include one capacitor) may include only the inherent resistance for the capacitors in the set, or may include other resistance artificially added to the capacitors, for example, additional resistance added to, added within, or connected to capacitors. Preferably, the ESR of the set of capacitors is set equal to, or substantially equal to, the ESR Reff of the immediately previous stage. For the purposes of this evaluation, Reff for a previous stage includes the resistance for all components of that previous stage (including, for example, any capacitors, any resistors, and any wiring, pins or other components) and in addition any interconnect resistance between the previous stage and the current stage (e.g., any wires or pins connecting the two stages). In alternate embodiments, Reff may be evaluated based on other or additional criteria, such as resistance in stages prior to the previous stage.

In some cases, Reff for a stage may be substantially equal to the resistance of the capacitors for that stage. For example, since in one embodiment the bulk capacitors and mid-frequency capacitors are relatively near to each other, for the purposes of an embodiment of the present invention the resistance in the wiring connecting the bulk and mid-frequency stages is not considered significant; thus Rmf is set equal to Rblk. In contrast, the socket pins may create a resistance Rskt 76, and thus Rcpkg is set equal to Rmf+Rskt.

In step 30, the capacitance for the capacitors of the current stage is set. In one embodiment, the capacitance C for the set of capacitors in the current stage is selected by referring to the effective inductive time constant for the previous stage; preferably the RC time constant for the set of capacitors for the current stage is set equal to, or substantially equal to, the effective L/R time constant of the previous stage, based on the effective inductance Leff and the effective resistance Reff of the previous stage. Thus: $R_{curr} \cdot C_{curr} = \text{Leff}_{prev}/\text{Reff}_{prev}$. The capacitance for the current stage can then be determined: $C_{curr} = \text{Leff}_{prev}/(\text{Reff}_{prev} \cdot R_{curr})$. For the purposes of this evaluation, Leff for a previous stage includes all inductance caused by the components of that previous stage (including, for example, any capacitors, any resistors, and any wiring, pins or other components) and in addition any inductance caused by the connections between the previous stage and the current stage (e.g., any wires or pins connecting the two stages). Preferably, for the purposes of this evaluation, $\text{Reff}_{prev}$ is as defined it is defined in step 20; alternately the definition of $\text{Reff}_{prev}$ for step 30 may differ from that of step 20. In alternate embodiments, the inductance and resistance for the previous stage may be evaluated in different manners. For example, Leff may be evaluated based on inductance in stages prior to the immediately previous stage.

For example, if there is no significant interconnect between the bulk stage 410 and the mid-frequency stage 420, Cmf is selected according to Cmf=Lblk/(Rblk·Rmf). Further, due to Lskt 78 and Rskt 76, Cpkg 80 may be selected according to: Cpkg=(Lskt+Lmf)/[Rcpkg·(Rskt+Rmf)]

In step 40, if more stages need evaluation, the method returns to step 20; if no more stages need evaluation, the method ends.

Preferably, before the sequence of steps 10–40 above are carried out, the inductance of each stage of the system is reduced as much as is feasible. Methods of reducing the inductance of a power delivery system are known. For example, using effective layout methods on the motherboard or in the package are known.

In one embodiment, performing the sequence of steps 10–40 above provides a set of parameters which are usually 90% accurate or better with respect to an idealized system. After the sequence of steps 10–40 above is carried out, further optimization and adjustment of parameters may be performed, according to known methods. For example, the system may be experimentally reproduced or simulated, and the parameters adjusted to further reduce capacitance and to further ensure that voltage tolerances are met. In such a simulation, for each stage, stages beyond the immediately previous stage (e.g., N-2, N-3, etc) may be taken into account.

Another way of viewing the system and method of the present invention is according to frequency domain analysis. In an alternate embodiment of the system and method of the present invention, in step 30, above, the capacitance of a stage N may be set by selecting the $|Z(f)|+3$ DB point of stage N to be equal to or substantially equal to the $|Z(f)|+3$ DB point of stage N-1, where $|Z(f)|$ is the absolute value of the impedance profile of the power delivery network at frequency f as seen from the nodes of current stage N backwards for all the previous stages from the Vreg up to stage N and including stage N. The $|Z(f)|+3$ DB point of stage N-1 is found according to the formula: $f_{+3\ DB} = (2 \cdot \pi (\text{Leffprev}/\text{Reffprev}))^{-1}$. The $|Z(f)|+3$ DB point of stage N is found according to the formula: $f_{+3\ DB} = (2 \cdot \pi \cdot \text{Rcurr} \cdot \text{Ccurr})^{-1}$. Setting the $|Z(f)|+3$ DB point of stage N equal to the $|Z(f)|+3$ DB point of stage N-1, the capacitance of stage N may be solved according to the formula Ccurr=Leffprev/(Reffprev·Rcurr).

In a power delivery system according to an embodiment of the system and method of the present invention, for example the power delivery system of FIG. 1, the above process is performed to set parameters for at least two of the decoupling stages sited after the power supply. Thus, for example, first components of the bulk capacitor stage 410 (capacitors 60 having a capacitance $C_{blk}$ and a resistance $R_{blk}$ 62) may be defined based on parameters of the power supply: $R_{blk} = \text{Reff}_{reg}$, and $C_{blk} = \text{Leff}_{reg}/(\text{Reff}_{reg} \cdot R_{blk})$. An embodiment of the system and method of the present invention provides that decoupling stages after the bulk capacitor stage may have parameters defined based on previous stages. For example, the mid-frequency stage 420 (capacitors 70 having a capacitance $C_{mf}$ and a resistance $R_{mf}$ 72) is defined based on parameters of the bulk capacitor stage 410: $R_{mf} = \text{Reff}_{blk}$, and $C_{mf} = \text{Leff}_{blk}/(\text{Reff}_{blk} \cdot R_{mf})$. In one embodiment of the system and method of the present invention, $\text{Reff}_{blk}$ is considered to be equal to $R_{blk}$ and $\text{Reff}_{mf}$ is considered to be equal to $R_{mf}$. In alternate embodiments, $\text{Reff}_{blk}$ may not equal $R_{blk}$ and $\text{Reff}_{mf}$ may not equal $R_{mf}$.

The parameters of the package capacitor stage 450 (capacitors 80 having a capacitance $C_{pkg}$ and a resistance Rcpkg 82) may be set based on the mid-frequency stage 420. In one embodiment, $R_{cpkg} = \text{Reff}_{mf}$, and $C_{pkg} = \text{Leff}_{mf}/(\text{Reff}_{mf} \cdot R_{cpkg})$, where $\text{Reff}_{mf} = R_{mf} + X$, and where X is the series resistance added by the socket pins (Rskt 76) and MB planes (included here in Rskt 76) which connect the mid-frequency capacitors 70 and bulk capacitors 60 to the package capacitors 80. In FIG. 1, $R_{cpkg} = \text{Reff}_{mf} = R_{mf} + R_{skt}$. To determine the parameters for the die stage 470 (capacitors 90 having a capacitance $C_{die}$ and a resistance $R_{die}$ 92), $R_{die} = \text{Reff}_{cpkg}$, and $C_{die} = \text{Leff}_{pkg}/(\text{Reff}_{cpkg} \cdot R_{die})$, where $\text{Reff}_{cpkg} = R_{cpkg} + Y$, where Y is the series resistance added by the package vias (Rpvia 86 from package vias 460) that connect the pin side package capacitors to the die. In alternate embodiments, other methods may be used to determine the parameters for the package and die stages, depending on parameters such as physical constraints.

For each decoupling stage, there is a range of current load fluctuation frequencies where the stage is capable of delivering power within the required voltage ranges. For each stage there are two frequency endpoints where, above a certain frequency the impedance of the stage rises and power is not delivered within the required voltage ranges, and below a certain frequency the impedance of the stage rises and power is not delivered within the required voltage ranges. To maximize the efficiency of the system, and to use components with a minimum of capacitance, the power delivery system is preferably tuned so that, as the frequency changes and one stage begins to respond poorly, an adjacent stage begins to respond properly.

Figure 3:
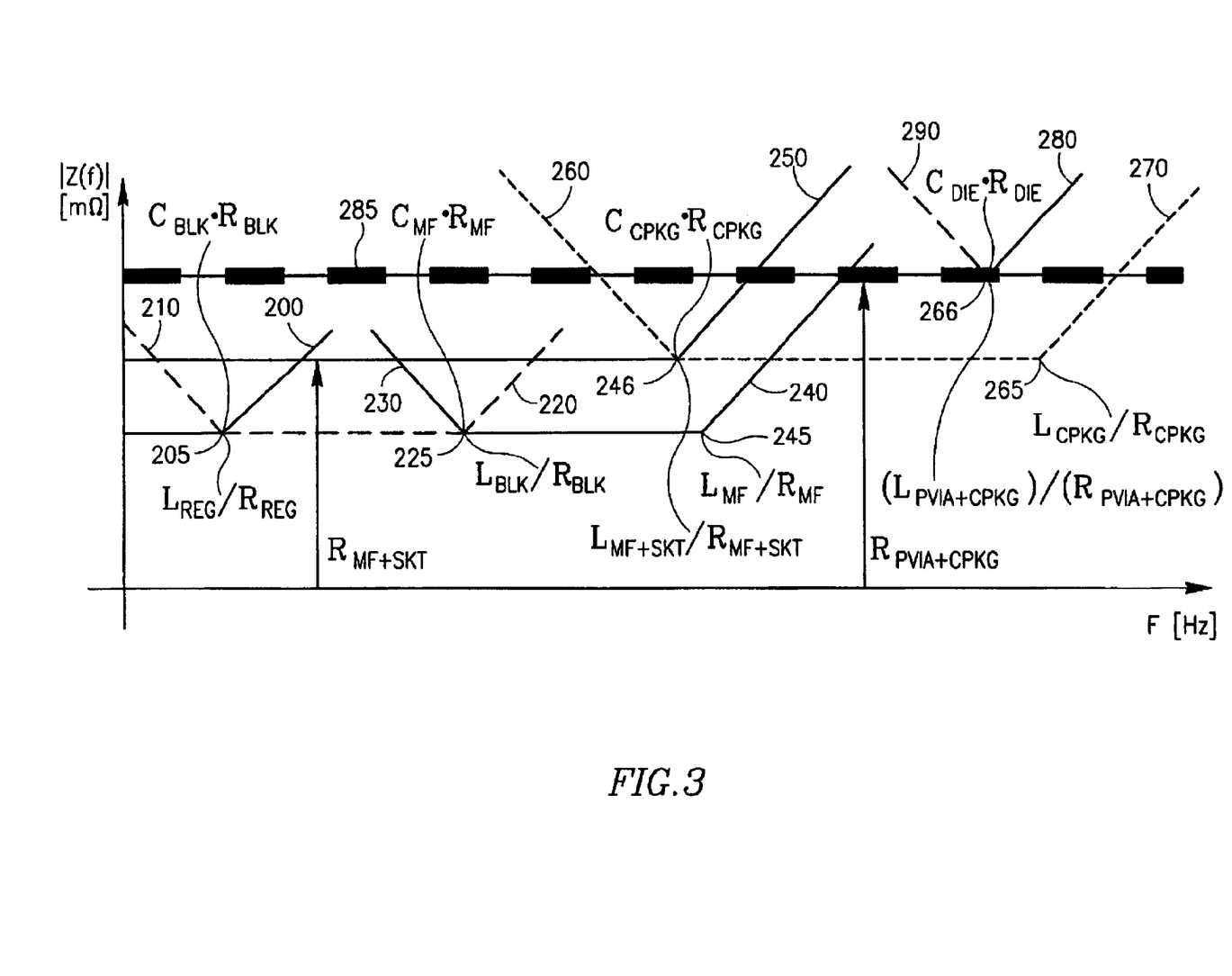
FIG. 3 is a graph showing frequency versus impedance for each stage of a power delivery system according to an embodiment of the present invention, and for the power delivery system as a whole.

FIG. 3 is a graph showing frequency versus impedance for each stage of a power delivery system according to an embodiment of the present invention, and for the power delivery system as a whole. As shown in FIG. 3, if a power delivery system is designed according to an embodiment of the system and method of the present invention, at all relevant frequencies, there is a constant impedance for the power delivery system, allowing for a proper response to current load fluctuations. At the point that one decoupling stage begins to not respond properly to current load fluctuations, another decoupling stage begins to respond properly. Thus, current load fluctuations at any frequency are handled properly by the overall power delivery system.

FIG. 3 illustrates that, for a power supply system according to an embodiment of the present invention, as the frequency of the current load fluctuation changes, the response of the voltage source to current demands begins to become less effective (as shown by the rising impedance curve 200), and the response of the bulk capacitors begins to become more effective (as shown by the falling impedance curve 210). At point 205, the inductive time constant of the voltage source Lreg/Rreg is equal to the capacitive time constant of the bulk capacitors Cblk·Rblk. At frequencies below point 205 the |Z(f)| impedance is set by Rreg. Due to the matching of Lreg/Rreg and Cblk·Rblk time constants and the selection of Rreg-Rblk, a flat frequency response with |Z(f)|=Rreg=Rblk is obtained until frequency reaches point 225. Increasing the current demand frequency above point 225 renders the response of the bulk capacitors less effective due to Lblk inductance (as shown by the rising impedance curve 220), at this point the response of the mid-frequency capacitors begins to become more effective (as shown by the falling line 230). At point 225, the inductive time constant of the bulk capacitors Lblk/Rblk is equal to the capacitive time constant Cmf·Rmf of the mid-frequency capacitors. Due to the matching of Lblk/Rblk and Cmf·Rmf time constants and the selection of Rmf=Rblk a flat frequency response with |Z(f)|=Rreg=Rblk=Rmf is obtained until the frequency reaches point 245.

Due to the socket series resistance Rskt, the impedance profile is shifted up to |Z(f)|=Rmf+Rskt, and due to the presence of socket series inductance Lskt the frequency response flatness is degraded to a point 246. Increasing the current demand frequency above point 246 renders the response of the mid-frequency capacitors to current demands less effective due to Lmf and Lskt inductance (as shown by the rising impedance curves 240 and 250). At this point the response of the package capacitors begins to become more effective (as shown by the falling impedance curve 260). At point 246, the effective inductive time constant (Lmf+Lskt)/(Rmf+Rskt) of the mid-frequency capacitors is equal to the capacitive time constant Cpkg·Rcpkg of the package capacitors, Due to the matching of (Lmf+Lskt)/(Rmf+Rskt) and Cpkg·Rcpkg time constants and the selection of Rcpkg=Rmf+Rskt, a flat frequency response with |Z(f)|=Rmf+Rskt=Rcpkg is obtained until the frequency reaches point 265. Due to the package via series resistance Rpvia, the impedance profile is shifted up to |Z(f)|=Rcpkg+Rpvia and due to the package via series inductance Lpvia, the frequency response flatness is degraded to a point 266.

Increasing the current demand frequency above point 266 renders the response of the package capacitors to current demands less effective (as shown by the rising impedance curves 270 and 280). At this point the response of the die capacitors begins to become more effective (as shown by the falling impedance curve 290). At point 266, the effective inductive time constant of the package capacitors (Lcpkg+Lpvia)/(Rcpkg+Rpvia) is equal to the capacitive time constant Cdie·Rdie of the on die decoupling capacitors. Since Cdie capacitance is located on the die, its inductance is assumed to be negligibly small for practical purposes. Due to the matching of the (Lcpkg+Lpvia)/(Rcpkg+Rpvia) and Cdie·Rdie time constants, and the selection of Rdie=Rcpkg+Rpvia, a flat frequency response 285 with |Z(f)|=Rcpkg+Rpvia=Rdie is obtained within the spectral content of the current demand frequency. Different analyses may be performed on power supplies according to alternate embodiments of the present invention.

A power supply according an exemplary embodiment of the present invention ideally provides power supply voltage to the CPU within the required tolerances and does not exhibit resonative behavior despite a wide range of CPU current stimuli spectral content, including very fast CPU current consumption change (e.g., subnanosecond changes from zero to tens of amperes). The flat frequency response of the impedance profile helps to ensure a low noise and ringing free response in the time domain to various stimuli, including such fast current changes.

Figure 4:
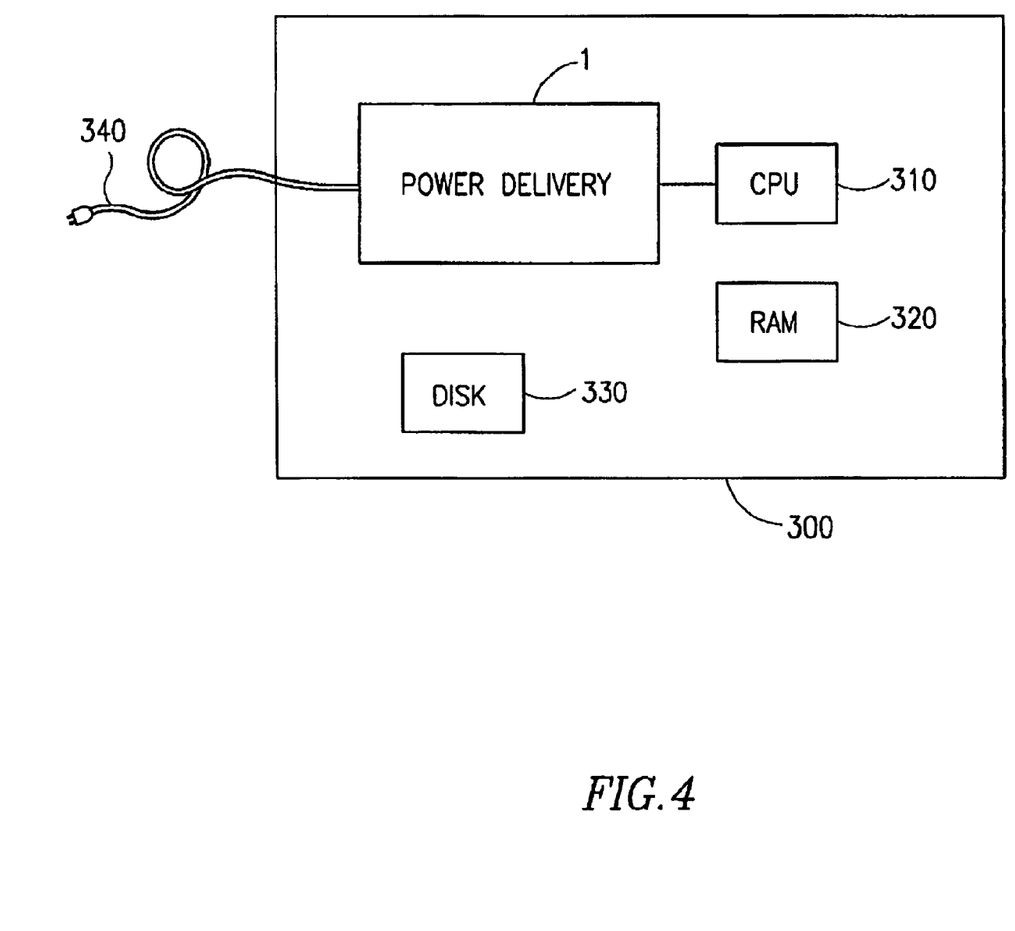
FIG. 4 illustrates a computing system including a power delivery system according to an embodiment of the invention.

In an exemplary embodiment of the system and method of the present invention, a power delivery system according to an embodiment of the invention is used in a computing system such as a personal computer (PC) or workstation system. FIG. 4 illustrates a computing system including a power delivery system according to an embodiment of the invention. Referring to FIG. 4, PC or workstation 300 includes power delivery system 1 delivering power to CPU 310, or, alternatively, multiple CPUs 310. PC or workstation 300 further includes a memory 320 (e.g., RAM, SRAM, DRAM), and a mass storage device (e.g., hard disk drive) 330. Preferably power delivery system 1 includes a power source 340, which is depicted as a lead to an A/C power supply, but which may be an alternate structure, such as a battery. PC or workstation 300 may include other arrangements of components. In alternate embodiments, a power delivery system according to an embodiment of the invention may be placed in other computing systems or devices.

It will be appreciated by persons skilled in the art that the present invention is not limited by what has been particularly shown and described hereinabove. Alternate embodiments are contemplated which fall within the scope of the invention. For example, the process of setting the capacitance, inductance and resistance for the stages of a power delivery system need not be followed for each stage of the power supply (e.g., the parameters of the die capacitors need not be set using the system and method of the present invention). Power delivery systems according to the system and method of the present invention may include stages other than those described herein.

What is claimed is:

1. A method for setting the parameters of a power delivery system, the power delivery system including n stages, n being at least three, the first stage being a power supply stage, the method comprising:

for each of a plurality of the stages:
setting a resistance of a set of capacitors for such stage substantially equal to a resistance of the previous stage; and
setting the time constant of the set of capacitors for such stage substantially equal to a time constant of the previous stage, wherein a time constant of the previous stage is defined by the inductance of the previous stage divided by the resistance of the previous stage.

2. The method of claim 1 wherein when setting the resistance of the set of capacitors for a stage, the effective resistance of the previous stage is referred to.

3. The method of claim 1 wherein when the step of setting the time constant of the set of capacitors for a stage is performed the time constant which is set is the capacitive time constant.

4. The method of claim 1, wherein the time constant of the previous stage is the effective inductive time constant.

5. The method of claim 1, wherein the resistance is the AC resistance.

6. The method of claim 1, wherein the resistance is the DC resistance.

7. The method of claim 1 wherein the plurality of stages includes at least a bulk capacitor stage.

8. The method of claim 1 wherein the plurality of stages includes at least a package capacitor stage.

9. The method of claim 1 wherein the plurality of stages includes at least a die capacitor stage.

10. The method of claim 1 wherein in the step of setting the resistance of the set of capacitors, the resistance of the previous stage is the effective series resistance of the previous stage.

11. The method of claim 1 wherein the time constant of the set of capacitors is defined by the resistance of the set of capacitors multiplied by the capacitance of the set of capacitors.

12. The method of claim 1 wherein the power supply stage includes at least a battery.

13. The method of claim 1 wherein the power supply stage includes at least an AC/DC converter.

14. A power delivery system comprising stages having parameters set according to claim 1, wherein in the step of setting the resistance of the set of capacitors, the resistance of such previous stage is the effective series resistance of such previous stage.

15. A power delivery system comprising stages having parameters set according to claim 1, the power delivery system comprising a die capacitor stage.

16. A computing system comprising:
a power delivery system, the power delivery system comprising stages having parameters set according to claim 1; and
an SRAM.

17. A power delivery system comprising stages having parameters set according to claim 1.

18. The power delivery system of claim 17 comprising a package capacitor stage.

19. The power delivery system of claim 17 comprising a die capacitor stage.

20. The power delivery system of claim 17 wherein in the step of setting the resistance of the set of capacitors, the resistance of the previous stage is the effective series resistance of the previous stage.

21. The power delivery system of claim 17 wherein the time constant of a set of capacitors is defined by the resistance of the set of capacitors multiplied by the capacitance of the set of capacitors.

22. The power delivery system of claim 17 wherein the power supply stage includes at least a battery.

23. The power delivery system of claim 17 wherein the power supply stage includes at least an AC/DC converter.

24. A method for setting the parameters of a power delivery system, the power delivery system including n stages, n being at least three, the first stage being a power supply stage, wherein the n plurality of stages includes at least a package capacitor stage, the method comprising:
for each of a plurality of the stages 2 through n:
setting a resistance of a set of capacitors for such stage substantially equal to a resistance of the previous stage; and
setting a capacitance of the set of capacitors for such stage based on a time constant of the previous stage.

25. A method for setting the parameters of a power delivery system, the power delivery system including n stages, n being at least three, the first stage being a power supply stage, the method comprising:
for each of a plurality of the stages 2 through n:
setting a resistance of a set of capacitors for such stage substantially equal to a resistance of the previous stage; and
setting a time constant of the set of capacitors for such stage substantially equal to a time constant of the previous stage, wherein the time constant of the set of capacitors for such stage is defined by the resistance of the set of capacitors multiplied by the capacitance of the set of capacitors, wherein the time constant of the previous stage is defined by the inductance of the previous stage divided by the resistance of the previous stage.

26. A power delivery system comprising:
a power supply stage; and
a plurality of subsequent stages, wherein, for at least two of the subsequent stages:
each such stage includes at least a set of capacitors, each set of capacitors including a resistance and a capacitance;
for each such stage, the resistance of the set of capacitors is substantially equal to the resistance of the previous stage; the resistance of the set of capacitors for the first such stage being substantially equal to the resistance of the power supply stage;
for each such stage, the time constant of the set of capacitors is substantially equal to the time constant of the previous stage; the time constant of the first stage being substantially equal to the time constant of the power supply.

27. The power delivery system of claim 26 wherein for each set of capacitors where the resistance is substantially equal to the resistance of the previous stage, the effective resistance of the previous stage is referred to.

28. The power delivery system of claim 26 wherein for each set of capacitors, the time constant of the previous stage is the effective inductive time constant.

29. The power delivery system of claim 26 wherein for each set of capacitors, the time constant which is set equal to the time constant of the previous stage is the capacitive time constant.

30. The power delivery system of claim 26 wherein the resistance is the AC resistance.

31. The power delivery system of claim 26 wherein the resistance is the DC resistance.

32. The power delivery system of claim 26, wherein, for a stage, the time constant of the previous stage is defined by the inductance of the previous stage divided by the resistance of the previous stage.

33. The power delivery system of claim 26, wherein the time constant of the power supply is defined by the inductance of the power supply divided by the resistance of the power supply.

34. The power delivery system of claim 26, wherein the time constant of the set of capacitors for a stage is defined by the resistance of the set of capacitors multiplied by the capacitance of the set of capacitors.

35. The power delivery system of claim 26 comprising a package capacitor stage.

36. The power delivery system of claim 26 wherein the power supply stage includes at least a battery.

37. The power delivery system of claim 26 wherein the power supply stage includes at least an AC/DC converter.

38. A power delivery system comprising:
   a power supply stage; and
   a plurality of subsequent stages, wherein, for at least two of the subsequent stages:
   each such stage includes at least a set of capacitors, each set of capacitors including a resistance and a capacitance;
   for each such stage, the resistance of the set of capacitors is substantially equal to the resistance of the previous stage; the resistance of the set of capacitors for the first such stage being substantially equal to the resistance of the power supply stage;
   for each such stage, the time constant of the set of capacitors is substantially equal to the time constant of the previous stage; the time constant of the previous stage being defined by the inductance of such previous stage divided by the resistance of such previous stage; the time constant of the first stage being substantially equal to the time constant of the power supply.

39. A power delivery system comprising:
   a power supply stage; and
   a plurality of subsequent stages, wherein, for at least two of the subsequent stages:
   each such stage includes at least a set of capacitors, each set of capacitors including a resistance and a capacitance;
   for each such stage, the resistance of the set of capacitors is substantially equal to the resistance of the previous stage; the resistance of the set of capacitors for the first such stage being substantially equal to the resistance of the power supply stage;
   for each such stage, the capacitance of the set of capacitors is set based on the time constant of the previous stage.

40. A method for setting the parameters of a power delivery system, the power delivery system including n stages, n being at least three, the first stage being a power supply stage, the method comprising:
   for a plurality of the stages 2 through n:
   providing that a resistance of a set of capacitors for such stage is substantially equal to a resistance of the previous stage; and
   providing that a time constant of the set of capacitors for such stage is substantially equal to a time constant of the previous stage.

41. The method of claim 40 wherein the power delivery system includes at least a package capacitor stage.

42. The method of claim 40 wherein when providing that the resistance of the set of capacitors for a stage is substantially equal to the resistance of the previous stage, the resistance of the previous stage is the effective series resistance of the previous stage.

43. The method of claim 40 wherein the time constant of a set of capacitors is defined by the resistance of the set of capacitors multiplied by the capacitance of the set of capacitors.

44. The method of claim 40 wherein the power supply stage includes at least a battery.

45. The method of claim 40 wherein the power supply stage includes at least an AC/DC converter.

46. A method setting the parameters of a power delivery system, the power delivery system including n stages, n being at least three, the first stage being a power supply stage, the method comprising:
   for a plurality of the stages 2 through n:
   providing that a resistance of a set of capacitors for such stage is substantially equal to an effective series resistance of the previous stage; and
   providing that a time constant of the set of capacitors for such stage is substantially equal to a time constant of the previous stage.

47. A method for setting the parameters of a power delivery system, the power delivery system including n stages, n being at least three, the first stage being a power supply stage, the method comprising:
   for a plurality of the stages 2 through n:
   setting a resistance of a set of capacitors for the stage substantially equal to a resistance of the previous stage; and
   selecting a $|Z(f)|+3$ DB point of the stage to be substantially equal to an effective $|Z(f)|+3$ DB point of the previous stage N- 1.

48. The method of claim 47 wherein the power delivery system includes at least a package capacitor stage.

49. The method of claim 47 wherein when providing that the resistance of the set of capacitors for a stage is substantially equal to the resistance of the previous stage, the resistance of the previous stage is defined as the effective series resistance of that previous stage.

50. A power delivery system comprising stages having parameters set according to claim 47.

51. A power delivery system according to claim 47 comprising a battery.

52. A power delivery system according to claim 47 comprising a set of package capacitors.

53. A power delivery system comprising:
   a power supply means; and
   a plurality of subsequent power stage means, wherein, for at least two of the subsequent power stage means:
   each such power stage means includes at least a set of capacitors, each set of capacitors including a resistance and a capacitance;
   for each such power stage means, the resistance of the set of capacitors is substantially equal to the resistance of the previous power stage means; the resistance of the set of capacitors for the first such power stage means being substantially equal to the resistance of the power supply means;
   for each such power stage means, the time constant of the set of capacitors is substantially equal to the time constant of the previous power stage means; the time constant of the first power stage means being substantially equal to the time constant of the power supply means.

* * * * *